UNITED STATES PATENT OFFICE.

HERMANN LAESSIG, OF BERLIN, GERMANY.

NON-ALCOHOLIC CONCENTRATED BEVERAGE AND PROCESS FOR ITS MANUFACTURE.

1,191,440.  Specification of Letters Patent.  Patented July 18, 1916.

No Drawing.  Application filed August 6, 1914. Serial No. 855,464.

*To all whom it may concern:*

Be it known that I, HERMANN LAESSIG, a citizen of the German Empire, residing at No. 41 Eisenacherstrasse, Berlin, Germany, have invented certain new and useful Improvements in a Non-Alcoholic Concentrated Beverage and a Process for Its Manufacture, of which the following is a specification.

This invention relates to a concentrated non-alcoholic beverage, consisting of an invert sugar solution containing lactic acid. To obtain this essence, whey is preferably used in which lactic acid is produced by fermentation with suitable pure cultures of lactic acid bacteria, whereupon the serum liquid containing lactic acid is mixed with cane sugar and heated, thus converting the cane sugar into invert sugar. The proportion of sugar is calculated so as to insure a stable solution.

To obtain the end product desired, it must contain at the same time lactic acid and invert sugar in proper proportion, as on this depends the pleasant taste and the stability of the essence. The use of whey as raw material for the lactic acid required, results in an economical utilization of this waste product of dairies, and increases the healthy action of the essence owing to the fact that fermented whey contains the salts of natural milk, and salts of lactic acid. The ability of lactic acid to convert cane sugar into invert sugar on heating, makes it possible to obtain a product which is stable owing to the high proportion of invert sugar, and has a pleasant taste owing to the simultaneous presence of lactic acid, by using the cheap product of sugar mills.

In carrying out the invention, the following process can be used: The whey is mixed with lactic acid bacteria and left to ferment at about 35–45° C. A serum containing about 2% of lactic acid is obtained and filtered. This serum is concentrated, preferably by freezing, until the proportion of lactic acid is about 5%, and thereupon mixed with cane sugar (refined sugar) in the proportion of about 4 kg. sugar to 3 liters of liquid. The solution of sugar containing lactic acid, is heated to about 100° C., whereupon an inversion of the cane sugar takes place which is practically at an end when the said temperature is reached. The inversion can also be carried out at a lower temperature in a correspondingly longer time. After the inversion of the sugar is completed, the solution is filtered, and is then ready for direct use with addition of water. To improve the taste, small quantities of fruit juices or other aromatic substances could be added to the essence.

What I claim is:—

1. A process of manufacture of a food preparation adapted for use in making therefrom a non-alcoholic beverage by addition of water, consisting in mixing a lactic-acid-containing material with a sugar component of such quality and under such conditions that the resulting mixture product contains lactic acid and invert sugar and on account of the sugar-content is stable upon exposure to the air.

2. A process of manufacture of a food preparation adapted for use in making therefrom a non-alcoholic beverage by addition of water, consisting in mixing a lactic-acid-containing material with a cane-sugar-containing material, securing conditions of reaction between the lactic acid and the cane-sugar so as to form invert sugar, the proportion of sugar used being such as to insure the formation of a product stable upon exposure to the air.

3. A process of manufacture of a food preparation adapted for use in making therefrom a non-alcoholic beverage by addition of water, consisting in mixing a lactic-acid-containing material with a sugar component of such quality and under such conditions that the resulting mixture product contains lactic acid and invert sugar and on account of the sugar content is stable upon exposure to the air, the content of lactic acid in the final product being about four parts by weight or more to each 100 parts by weight of sugar.

4. A process of manufacture of a food preparation adapted for use in making therefrom a non-alcoholic beverage by addition of water, consisting in mixing milk serum containing lactic acid with a sugar component of such quality and under such conditions that the resulting mixture product contains lactic acid and invert sugar and on account of the sugar content is stable upon exposure to the air.

5. A process of manufacture of a food preparation adapted for use in making therefrom a non-alcoholic beverage by addition of water, consisting in mixing milk serum containing lactic acid with a sugar component of such quality and under such conditions that invert sugar is formed within said mixture under the influence of the lactic acid present therein, the proportion of sugar used being such as to insure stability of the product upon exposure to the air.

6. A process of manufacture of a food preparation adapted for use in making therefrom a non-alcoholic beverage by addition of water, consisting in mixing milk serum containing lactic acid with cane-sugar, bringing the mixture under such conditions of temperature as to enable the lactic acid to convert the cane-sugar into invert sugar, the proportion of sugar used being such as to insure stability of the product upon exposure to the air.

7. A process of manufacture of a food preparation adapted for use in making therefrom a non-alcoholic beverage by addition of water, consisting in mixing milk serum containing lactic acid with cane-sugar, and heating so as to convert the cane-sugar into invert sugar, the proportion of sugar used being such as to insure stability of the product upon exposure to the air.

8. A process of manufacturing a food preparation adapted for use in making therefrom a non-alcoholic beverage by addition of water, consisting in fermenting whey material by means of lactic acid bacteria, enriching the product in lactic acid by freezing, mixing the so-produced lactic acid material with a substance adapted to react with the lactic acid so as to form invert sugar, and regulating the conditions of such reaction so that the final product contains sufficient invert sugar to insure stability upon exposure to the air.

9. A process of manufacturing a food preparation adapted for use in making therefrom a non-alcoholic beverage by addition of water, consisting in fermenting whey material by means of lactic acid bacteria, enriching the product in lactic acid by freezing, mixing the so-produced lactic-acid material with a cane-sugar-containing material, and heating so as to convert the cane-sugar into invert sugar, the proportion of sugar used being such as to insure stability of the product upon exposure to the air.

10. A food preparation consisting of an invert sugar solution stable on account of its degree of concentration, and containing lactic acid.

11. A food preparation consisting of an invert sugar solution stable on account of its degree of concentration, and containing lactic acid produced by fermentation.

12. A food preparation consisting of an invert sugar solution stable on account of its degree of concentration in a fermented milk serum.

In testimony whereof I affix my signature in presence of two witnesses.

HERMANN LAESSIG.

Witnesses:
HENRY HASPER,
WOLDEMAR HAUPT.

Copies of this patent may be obtained for five cents each, by addressing the "Commissioner of Patents, Washington, D. C."